United States Patent
Chang et al.

(10) Patent No.: US 9,805,097 B2
(45) Date of Patent: Oct. 31, 2017

(54) METHOD AND SYSTEM FOR PROVIDING A SEARCH RESULT

(71) Applicant: EXCALIBUR IP, LLC, Sunnyvale, CA (US)

(72) Inventors: Ming Chang, Beijing (CN); Jian Xu, San Jose, CA (US); Yu Zou, Beijing (CN); Ke Wen, Beijing (CN)

(73) Assignee: EXCALIBUR IP, LLC, Sunnyvale, CA (US)

( * ) Notice: Subject to any disclaimer, the term of this patent is extended or adjusted under 35 U.S.C. 154(b) by 367 days.

(21) Appl. No.: 14/435,660

(22) PCT Filed: Dec. 17, 2014

(86) PCT No.: PCT/CN2014/094122
§ 371 (c)(1),
(2) Date: Apr. 14, 2015

(87) PCT Pub. No.: WO2016/095135
PCT Pub. Date: Jun. 23, 2016

(65) Prior Publication Data
US 2016/0357745 A1  Dec. 8, 2016

(51) Int. Cl.
*G06F 17/30* (2006.01)
*G06Q 30/02* (2012.01)

(52) U.S. Cl.
CPC ...... *G06F 17/3053* (2013.01); *G06F 17/3097* (2013.01); *G06F 17/30696* (2013.01); *G06F 17/30864* (2013.01); *G06Q 30/0277* (2013.01)

(58) Field of Classification Search
CPC ........... G06F 17/3053; G06F 17/30864; G06F 17/3097; G06F 17/30696; G06Q 30/0277

(Continued)

(56) References Cited

U.S. PATENT DOCUMENTS 7,693,827 B2 * 4/2010 Zamir ............... G06F 17/30867
707/999.003
8,386,469 B2 * 2/2013 Reuther ............ G06F 17/30427
707/713

(Continued)

FOREIGN PATENT DOCUMENTS

CN 102067105 A 5/2011
CN 103430176 A 12/2013

(Continued)

OTHER PUBLICATIONS

Teevan, Jaime, et al., "Personalizing Search via Automated Analysis of Interests and Activities", SIGIR '05, Salvador, Brazil, Aug. 15-19, 2005, pp. 449-456.*

(Continued)

*Primary Examiner* — Robert Stevens
(74) *Attorney, Agent, or Firm* — Pillsbury Winthrop Shaw Pittman LLP

(57) ABSTRACT

The present teaching relates to providing a search result. In one example, a search request is received from a user. A plurality of content items is determined based on the search request. One or more content items are selected from the plurality of content items. A framed structure having at least one sub-component is generated. A correspondence is determined between the one or more content items and the at least one sub-component. Each of the one or more content items is arranged with respect to a corresponding sub-component. A search result is generated based on the one or more content items and the framed structure. The search result is provided.

20 Claims, 15 Drawing Sheets

(58) Field of Classification Search
USPC .......................................................... 707/706
See application file for complete search history.

(56) References Cited

U.S. PATENT DOCUMENTS

| | | | | |
|---|---|---|---|---|
| 8,583,673 | B2* | 11/2013 | Tarek | G06F 17/30731 |
| | | | | 707/713 |
| 9,235,852 | B2* | 1/2016 | Hylton | G06Q 30/02 |
| 9,336,285 | B2* | 5/2016 | Vidra | G06F 17/30554 |
| 9,569,728 | B2* | 2/2017 | Cohen | G06N 5/02 |
| 9,679,082 | B2* | 6/2017 | Fernandez-Ruiz | G06F 17/30991 |
| 2005/0222989 | A1* | 10/2005 | Haveliwala | G06Q 30/02 |
| 2008/0183672 | A1* | 7/2008 | Canon | G06F 17/30905 |
| 2009/0240677 | A1 | 9/2009 | Parekh et al. | |
| 2009/0240683 | A1* | 9/2009 | Lazier | G06F 17/30864 |
| 2012/0246165 | A1 | 9/2012 | Batraski et al. | |
| 2013/0311458 | A1 | 11/2012 | Goel et al. | |
| 2014/0046922 | A1 | 2/2014 | Crook et al. | |
| 2014/0280038 | A1* | 9/2014 | O'Sullivan | C12N 15/8286 |
| | | | | 707/722 |
| 2014/0358701 | A1* | 12/2014 | Hylton | G06Q 30/02 |
| | | | | 705/14.73 |
| 2015/0039589 | A1* | 2/2015 | Collins | G06F 17/30867 |
| | | | | 707/722 |
| 2015/0169772 | A1* | 6/2015 | Alonso | G06Q 30/00 |
| | | | | 707/728 |
| 2015/0170203 | A1* | 6/2015 | Kogan | G06F 17/30696 |
| | | | | 705/14.54 |
| 2015/0205768 | A1* | 7/2015 | Fernadez-Ruiz | G06F 17/30867 |
| | | | | 715/234 |
| 2016/0188599 | A1* | 6/2016 | Maarek | G06F 17/30979 |
| | | | | 707/728 |
| 2016/0283585 | A1* | 9/2016 | Zheng | G06F 17/30719 |

FOREIGN PATENT DOCUMENTS

| | | |
|---|---|---|
| WO | 2013173099 A2 | 11/2013 |
| WO | 2014025711 A1 | 2/2014 |

OTHER PUBLICATIONS

Topkara, Mercan, et al., "Tag Me While You Can: Making Online Recorded Meetings Shareable and Searchable", IBM Research Report, RC25038 (W1008-057), Aug. 18, 2010, 11 pages.*
International Search Report and Written Opinion dated Sep. 21, 2015 in International Application PCT/CN2014/094122, 11 pages.
International Preliminary Report on Patentability dated Jun. 29, 2017 in International Application PCT/CN2014/094122. 6 pages.

* cited by examiner

METHOD AND SYSTEM FOR PROVIDING A SEARCH RESULT

CROSS REFERENCE TO RELATED APPLICATION

This application is a national stage application, filed under 35 U.S.C. §371, of International Application No. PCT/CN2014/094122, filed on Dec. 17, 2014, entitled "METHOD AND SYSTEM FOR PROVIDING A SEARCH RESULT", which is hereby incorporated by reference in its entirety.

BACKGROUND

1. Technical Field

The present teaching relates to methods, systems, and programming for Internet services. Particularly, the present teaching is directed to methods, systems, and programming for providing a search result.

2. Discussion of Technical Background

The advancement in the Internet has made it possible to make a tremendous amount of information accessible to users located anywhere in the world. A user may search for information on the Internet with help from a search engine, which can generate a search result in response to a query from the user. A search result may include a list of items including query based links, sponsored links, images, maps, videos, query suggestions, etc.

Conventional approaches for providing a search result focus on presenting the items in the search result as a list. For example, a conventional search result includes items listed from top to bottom on a screen. This can limit user engagement on the search result as the user may lose interest after viewing the top two items. In addition, it is time consuming for the user to scroll up and down to find an interesting item with a listed presentation, especially on a small screen of a handheld device.

Therefore, there is a need to develop techniques to provide a search result to overcome the above drawbacks.

SUMMARY

The present teaching relates to methods, systems, and programming for Internet services. Particularly, the present teaching is directed to methods, systems, and programming for providing a search result.

In one example, a method, implemented on a machine having at least one processor, storage, and a communication platform connected to a network for providing a search result, is disclosed. A search request is received from a user. A plurality of content items is determined based on the search request. One or more content items are selected from the plurality of content items. A framed structure having at least one sub-component is generated. A correspondence is determined between the one or more content items and the at least one sub-component. Each of the one or more content items is arranged with respect to a corresponding sub-component. A search result is generated based on the one or more content items and the framed structure. The search result is provided.

In another example, a method, implemented on a machine having at least one processor, storage, and a communication platform connected to a network for providing a search result, is disclosed. A first search result is obtained including a plurality of content items. One or more content items are selected from the plurality of content items. A framed structure having at least one sub-component is generated. A correspondence is determined between the one or more content items and the at least one sub-component. The first search result is modified by moving each of the one or more content items into a corresponding sub-component. A second search result is generated based on the one or more content items and the framed structure. The second search result is provided.

In yet another example, a system having at least one processor, storage, and a communication platform connected to a network for providing a search result, is disclosed. The system comprises a request analyzer, an item retrieval unit, a framed structure adapter, an item selection unit, an item assignment unit, and a search result organizer. The request analyzer is configured for receiving a search request from a user. The item retrieval unit is configured for determining a plurality of content items based on the search request and selecting one or more content items from the plurality of content items. The framed structure adapter is configured for generating a framed structure having at least one sub-component. The item selection unit is configured for determining a correspondence between the one or more content items and the at least one sub-component. The item assignment unit is configured for arranging each of the one or more content items with respect to a corresponding sub-component. The search result organizer is configured for generating a search result based on the one or more content items and the framed structure and providing the search result.

In a different example, a system having at least one processor, storage, and a communication platform connected to a network for providing a search result, is disclosed. The system comprises a request analyzer, an item retrieval unit, a framed structure adapter, an item selection unit, an item assignment unit, and a search result organizer. The request analyzer is configured for obtaining a first search result including a plurality of content items. The item retrieval unit is configured for selecting one or more content items from the plurality of content items. The framed structure adapter is configured for generating a framed structure having at least one sub-component. The item selection unit is configured for determining a correspondence between the one or more content items and the at least one sub-component. The item assignment unit is configured for modifying the first search result by moving each of the one or more content items into a corresponding sub-component. The search result organizer is configured for generating a second search result based on the one or more content items and the framed structure and providing the second search result.

Other concepts relate to software for implementing the present teaching on providing a search result. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable tangible and non-transitory medium having information for providing a search result is disclosed. The information, when read by the machine, causes the machine to perform the following: receiving a search request from a user; determining a plurality of content items based on the search request; selecting one or more content items from the plurality of content items; generating a framed structure having at least one sub-component; determining a correspondence between the one or more content items and the at least one sub-component; arranging each of the one or more content items with respect to a corresponding sub-component; generating a search result based on the one or more content items and the framed structure; and providing the search result.

In another example, a machine-readable tangible and non-transitory medium having information for providing a search result is disclosed. The information, when read by the machine, causes the machine to perform the following: obtaining a first search result including a plurality of content items; selecting one or more content items from the plurality of content items; generating a framed structure having at least one sub-component; determining a correspondence between the one or more content items and the at least one sub-component; modifying the first search result by moving each of the one or more content items into a corresponding sub-component; generating a second search result based on the one or more content items and the framed structure; and providing the second search result.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 1 illustrates an exemplary presentation of content items provided in a search result, according to prior art;

FIG. 2 illustrate an exemplary presentation of content items provided in a search result, according to an embodiment of the present teaching;

DETAILED DESCRIPTION

Figure 3:
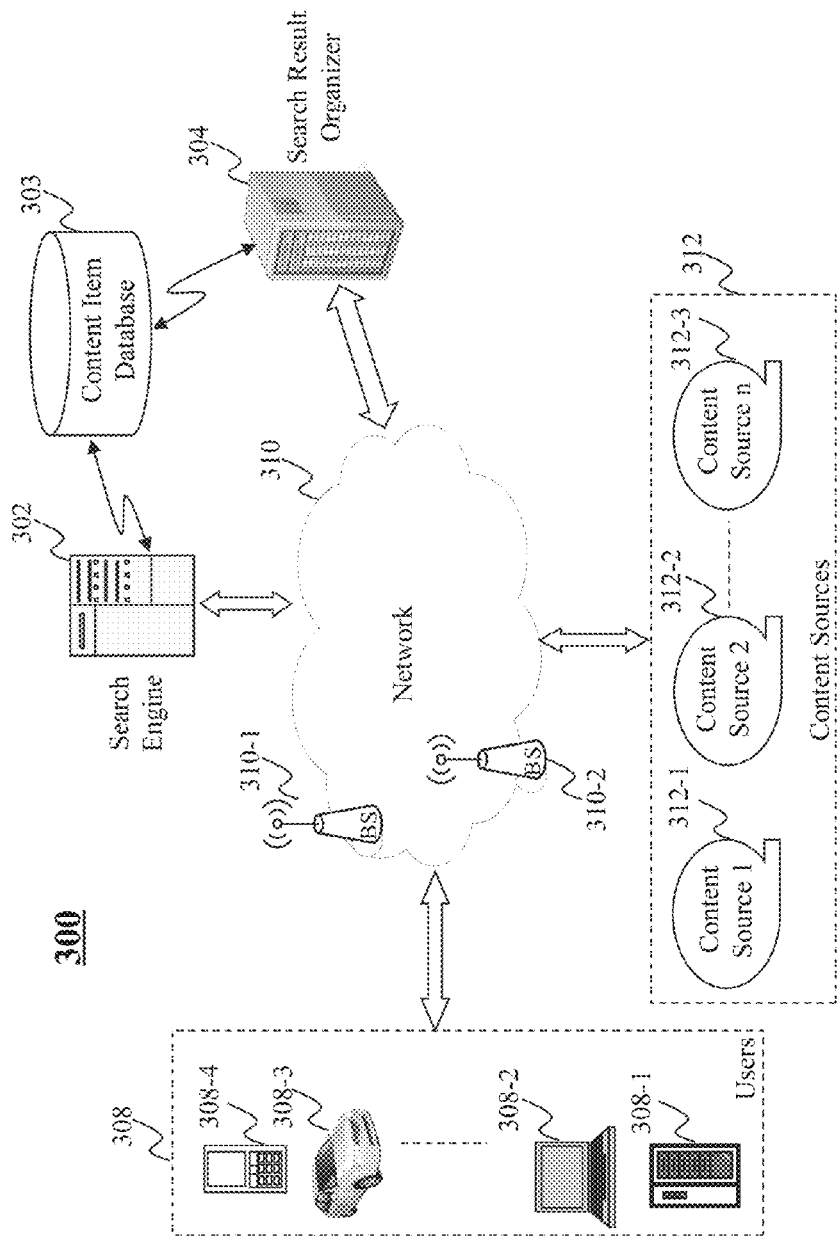
FIG. 3 is a high level depiction of an exemplary networked environment for providing a search result, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of search result generation and presentation, realized as a specialized and networked system by utilizing one or more computing devices (e.g., mobile phone, personal computer, etc.) and network communications (wired or wireless). The method and system as disclosed herein aim at providing a search result to a user to improve the user engagement and/or increase revenue for a search engine. After submitting a query to a search engine, a user may receive a search result including one or more content items. The user's interest on the items may be stimulated not only by their content but also by a manner of providing or presenting them.

Figure 1:
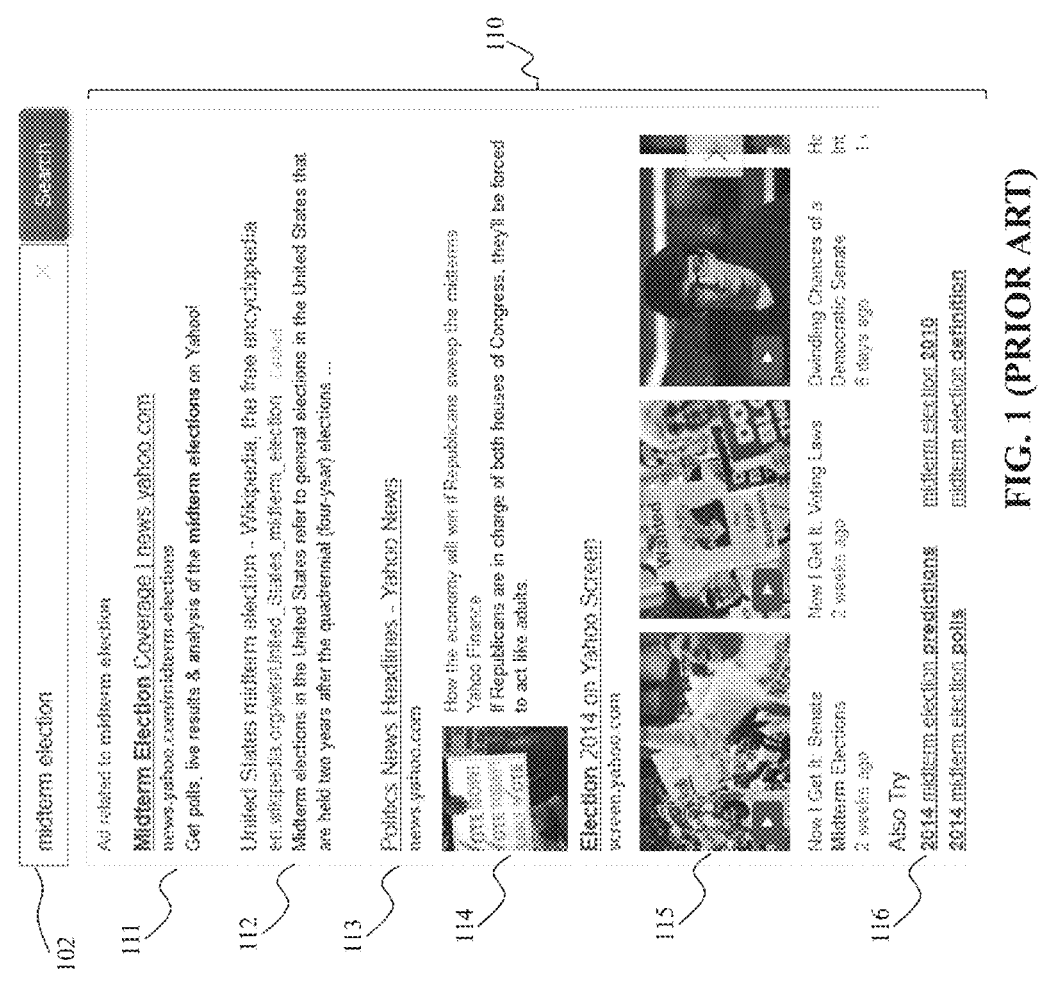

FIG. 1 illustrates an exemplary presentation of content items provided in a search result, according to prior art. In FIG. 1, a user input a query "midterm election" in the search box 102 and received a search result 110. The search result 110 in this example includes different types of items related to midterm election: an advertisement 111, a link 112, some news 113 including an image 114, some video clips 115, and some query suggestions 116. As shown in FIG. 1, the content items 111-116 are listed one after one below the query 102. The organization of search result items is limited to a one-dimensional list below the query 102.

Figure 2:
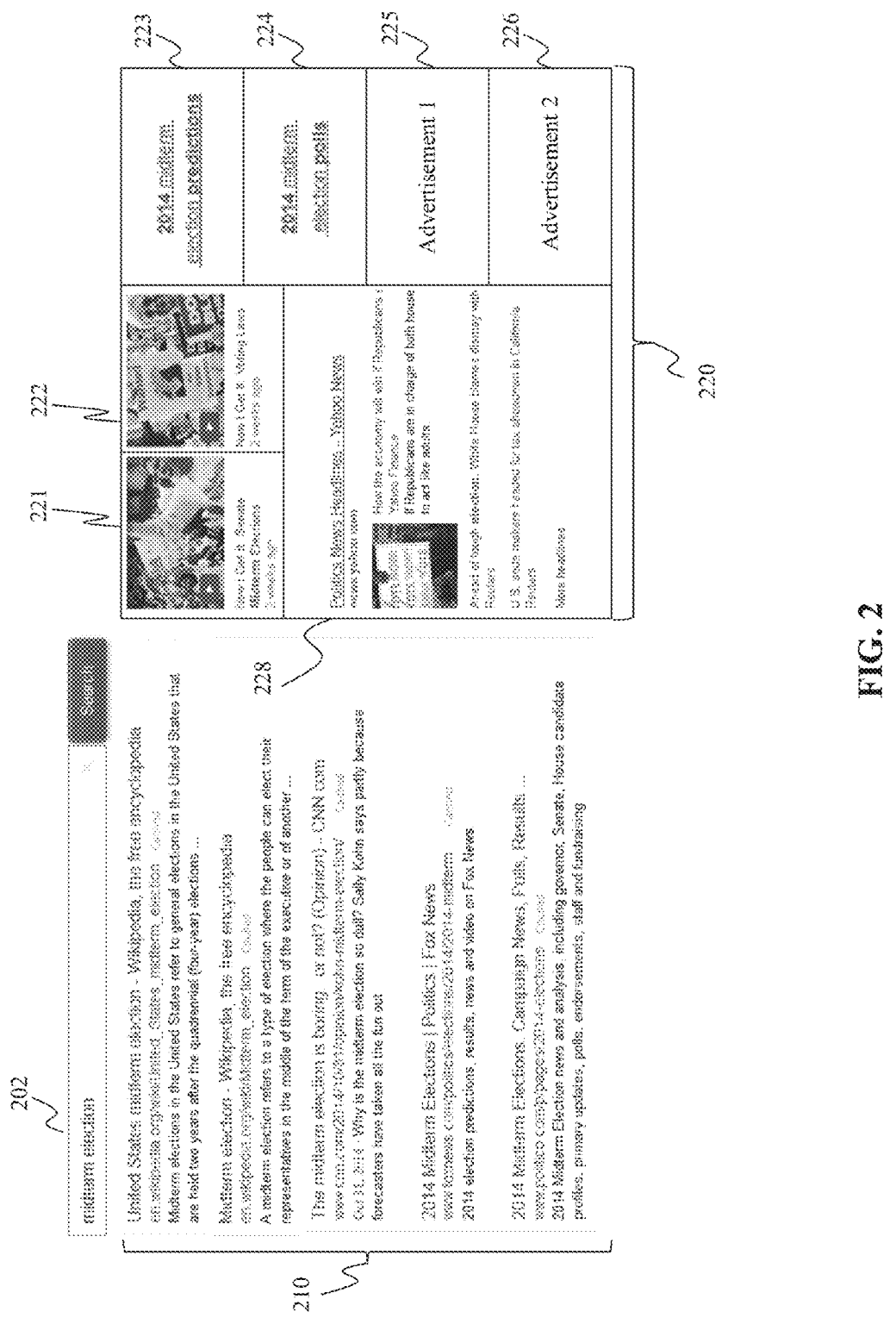

FIG. 2 illustrates an exemplary presentation of content items provided in a search result, according to an embodiment of the present teaching. In FIG. 2, a user input the query "midterm election" in the search box 202 and received a search result including a list of links 210 and a tiled presentation of content items 220. As shown in FIG. 2, the links 210 are related to the query "midterm election." In addition to the links 210, the search result includes some content items each presented in a frame (or a tile) on the right side of the links 210. In present disclosure, "framed structure" and "tiled structure" are used interchangeably to indicate a structure including one or more frames or tiles, like the structure 220.

The framed structure 220 in this example includes multiple frames with various sizes. Different content items related to the query may be arranged into different frames.

For example, two video clips related to "midterm election" are presented in frames 221 and 222. When the user clicks on one of the two video clips, a corresponding video may be presented and/or played in a pop-up window. In this example, some news headlines are shown in a big frame 228, while query suggestions "2014 midterm election prediction" and "2014 midterm election polls" are shown in smaller frames 223 and 224.

The assignment of content items into different frames may be determined based on the query, the content items, and/or the framed structure. For example, the system may analyze the query "midterm election" and some historical data to determine that the user is more likely to be interested in some news related to the "midterm election" than some advertisements related to "midterm election". This may be true especially when the search is performed around a time when a midterm election is held. In addition, the system may utilize a machine learning model to determine that it is better to assign content items into frames based on degrees of interest regarding the items, the frame sizes, and/or the frame positions. For example, the system may assign more interesting content items into larger frames and assign less interesting content items into smaller frames. In accordance with other models, the system may utilize response prediction or expected revenue to replace the degree of interest. By putting different content items into different frames with various sizes and positions, the system may attract more user engagement, e.g. higher click through rate (CTR), from the user. This is because the user can visually see different content items presented together, according to his/her interest. For example, the user can expect to see a most interesting content item or most desired item in a largest frame, while the degree of interest may decrease as the size of frame decreases. In this way, the user may have a quick understanding of the search result and know how to allocate his/her time on different content items. On the other hand, the system may utilize the framed structure to improve its expected revenue, which can come from increased user engagement.

In one embodiment, the content items in the framed structure 220 are determined based on the query "midterm election" and/or a layout of the framed structure 220. For example, the system may find ten content items related to the query "midterm election". Based on historical data analysis, however, the system may determine that the framed structure 220 has seven frames, as shown in FIG. 2. In this embodiment, the system selects seven from the ten content items and assigns them into corresponding frames. The selection may be based on relatedness between the content items and the query. The selection may also be based on types of the content items. For example, the ten content items include one news headline, two video clips, two advertisements, and five query suggestions. Then the system may remove three query suggestions and keep other content items, even if the three query suggestions are more related to the query than e.g. the two advertisements. This may be because the system has a cap on number of each type of content items in the framed structure 220, due to a concern of content diversity.

In another embodiment, the content items in a framed structure are pre-selected based on the query "midterm election", while the layout of the framed structure is determined based on the content items. For example, the system may find or select ten content items related to the query "midterm election" and decide to put all of the ten content items in a framed structure. In this embodiment, the system may divide the framed structure 220 into ten frames, where each frame corresponds to one of the ten content items. The system can predict a degree of interest or response rate from the user regarding each content item, based on a machine learning model. According to the predicted degree of interest or response rate for each content item, the system may determine a size of the corresponding frame where the content item will be assigned into. Based on the machine learning model, the system may also determine position and other layout information with respect to each frame in the framed structure. In this embodiment, the system may also have a cap on number of each type of content items in the framed structure 220, due to a concern of content diversity. If number of a type of pre-selected content items exceeds the cap, the system may remove some items of the type before determining the layout of the framed structure.

Hence, the system in present disclosure may optimize the content items and the layout of the framed structure in different manners. In practice, the system may also modify a previously generated search result to create a new search result. For example, the search result shown in FIG. 2 may be created by modifying the search result shown in FIG. 1.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 3 is a high level depiction of an exemplary networked environment 300 for providing a search result, according to an embodiment of the present teaching. In FIG. 3, the exemplary networked environment 300 includes a search engine 302, a content item database 303, a search result organizer 304, one or more users 308, a network 310, and content sources 312. The network 310 may be a single network or a combination of different networks. For example, the network 310 may be a local area network (LAN), a wide area network (WAN), a public network, a private network, a proprietary network, a Public Telephone Switched Network (PSTN), the Internet, a wireless network, a virtual network, or any combination thereof. In an example of Internet advertising, the network 310 may be an online advertising network or ad network that is a company connecting advertisers to web sites that want to host advertisements. The network 310 may also include various network access points, e.g., wired or wireless access points such as base stations or Internet exchange points 310-1 . . . 310-2, through which a data source may connect to the network 310 in order to transmit information via the network 310.

Users 308 may be of different types such as users connected to the network 310 via desktop computers 308-1, laptop computers 308-2, a built-in device in a motor vehicle 308-3, or a mobile device 308-4. A user 308 may send a search request to the search engine 302 via the network 310 and receive a search result from the search engine 302. The search result may be on a web page and may include content items like a document, news, a movie, music, an advertisement, a query suggestion, etc.

The search result organizer 304 may help the search engine 302 to organize the search result, based on one or more content items stored in the content item database 303. The search result organizer 304 may determine an organization style for the search result, e.g. a listed organization or a framed organization or a mixed organization of both. For a framed organization, the search result organizer 304 can retrieve content items from the content item database 303 and assign them into different frames as shown in FIG. 2. The search result organizer 304 may predict a response probability for each content item placed in each frame, and determine the assignment based on the predicted response probabilities. The search result organizer 304 may generate an organized search result directly or an instruction for the search engine 302 to generate an organized search result based on the instruction.

The content item database 303 may store different types of content items including query suggestions, advertisements, multimedia, etc. Each content item may come from a previous search result generated by the search engine 302 or the search result organizer 304.

The content sources 312 include multiple content sources 312-1, 312-2 . . . 312-3, such as vertical content sources. A content source 312 may correspond to a website hosted by an entity, whether an individual, a business, or an organization such as USPTO.gov, a content provider such as cnn.com and Yahoo.com, a social network website such as Facebook.com, or a content feed source such as tweeter or blogs. The search engine 302 and the search result organizer 304 may access information from any of the content sources 312-1, 312-2 . . . 312-3.

Figure 4:
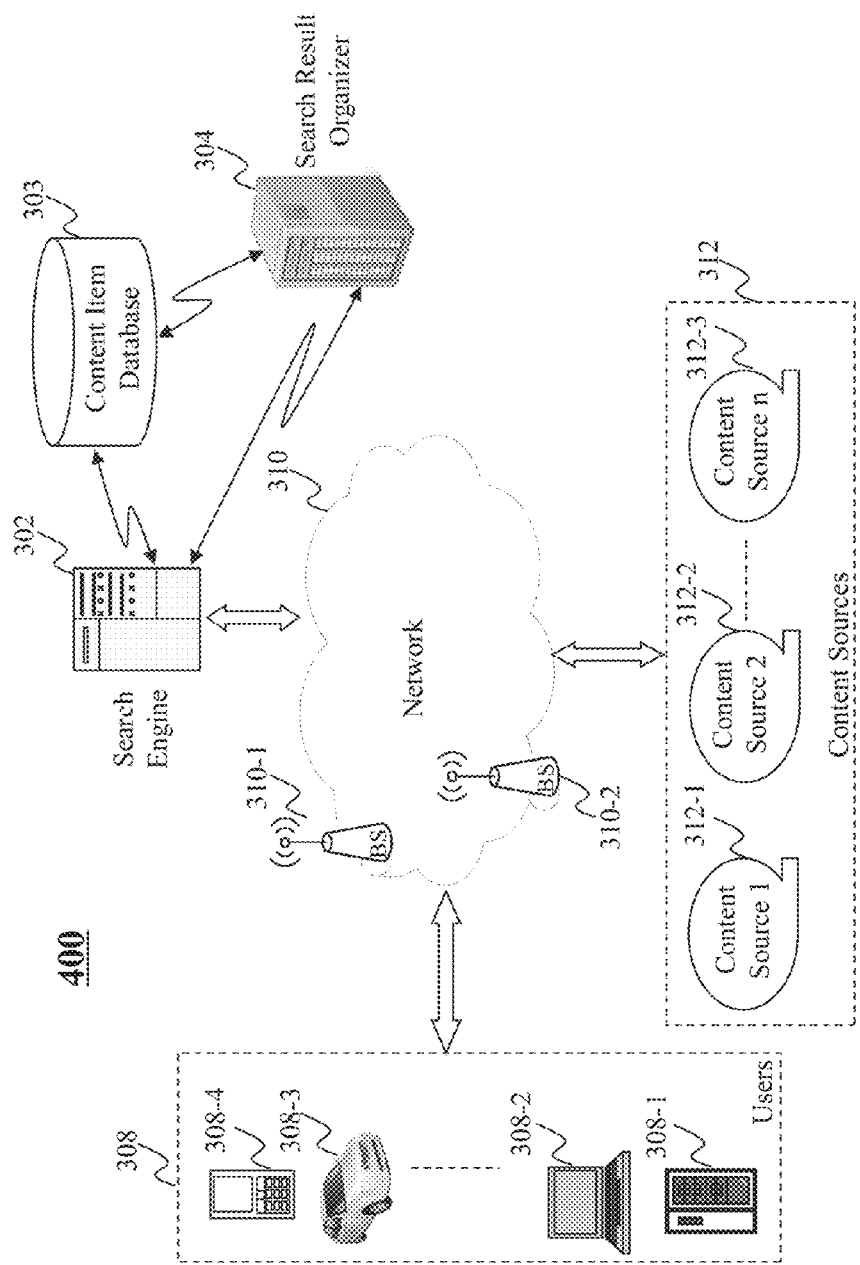
FIG. 4 is a high level depiction of another exemplary networked environment for providing a search result, according to an embodiment of the present teaching.

FIG. 4 is a high level depiction of another exemplary networked environment 400 for providing a search result, according to an embodiment of the present teaching. The exemplary networked environment 400 in this embodiment is similar to the exemplary networked environment 300 in FIG. 3, except that the search result organizer 304 serves as a backend system of the search engine 302.

Figure 5:
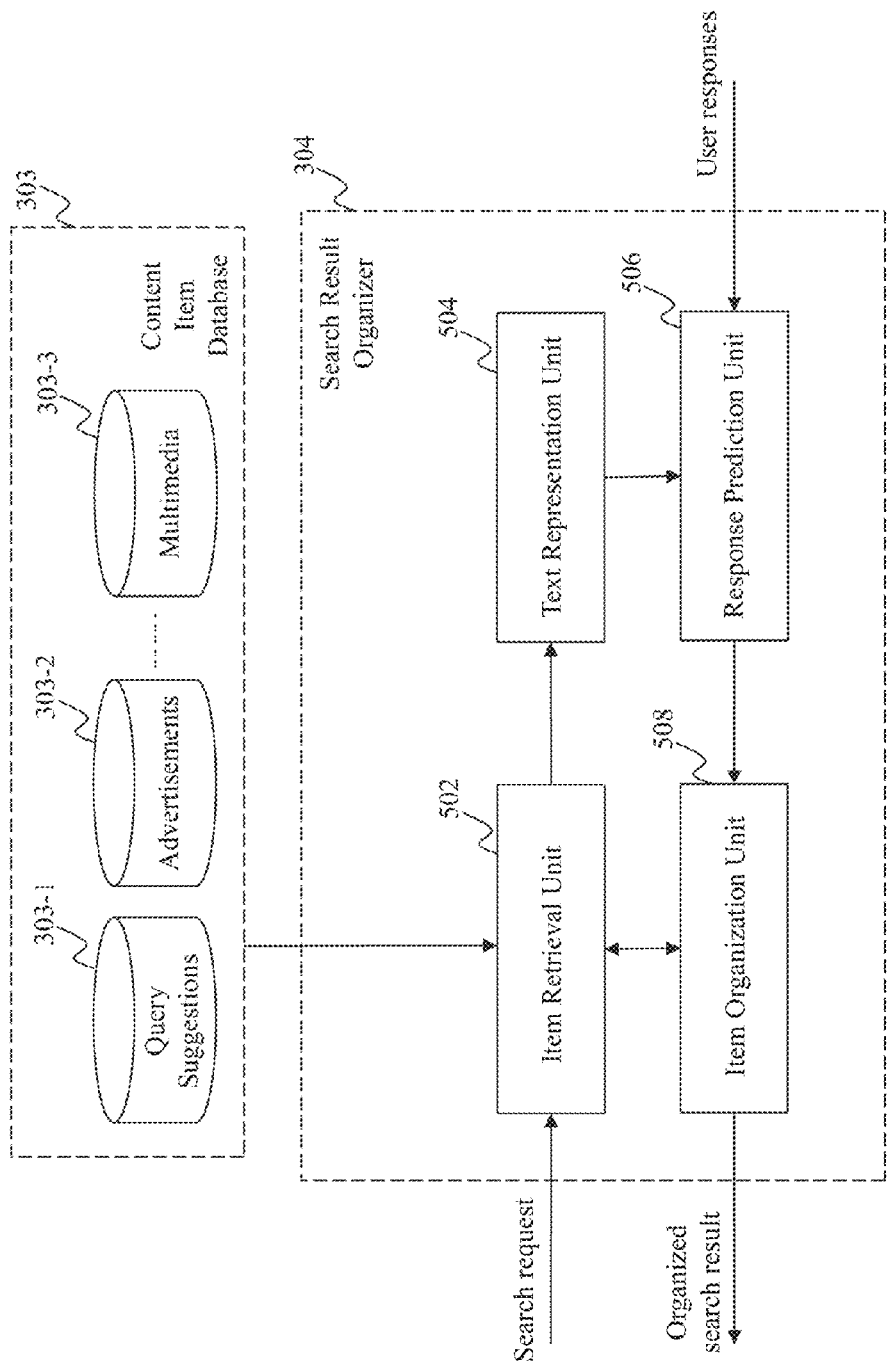
FIG. 5 illustrates an exemplary diagram of a search result organizer, according to an embodiment of the present teaching.

FIG. 5 illustrates an exemplary diagram of the search result organizer 304, according to an embodiment of the present teaching. The search result organizer 304 in this example includes an item retrieval unit 502, a text representation unit 504, a response prediction unit 506, and an item organization unit 508.

The item retrieval unit 502 in this example can receive a search request, either directly from a user or indirectly from the search engine 302. Based on the search request, the item retrieval unit 502 may identify a query and the user's identity. The item retrieval unit 502 may determine how to organize a search result, i.e. a search result organization style, based on the query and/or the user's identity. In one example, the item retrieval unit 502 may determine to provide a search result organized as a list for a query "smartphone patent publication pdf," because the user may be interested only in pdf files for patent publications related to smartphone. In another example, the item retrieval unit 502 may determine to provide a search result organized in a framed structure, because the user gave higher engagement on a framed structure than other organizations in his/her search history. In yet another example, the item retrieval unit 502 may determine to provide a search result organized such that some content items are presented in a list and some content items are presented in frames, e.g. as shown in FIG. 2.

After determining the search result organization style, the item retrieval unit 502 may retrieve content items from the content item database 303 based on the search request. The content item database 303 in this example may include sub-databases for storing information about query suggestions 303-1, advertisements 303-2, multimedia 303-3, etc. A retrieved content item may be related to the search request, e.g. based on a keyword match between the content item and the query. A retrieved content item may also be related to the search request based on a web page that the user was accessing or viewing when the user submitted the search request.

In one embodiment, the item retrieval unit 502 may first retrieve the content items and then determine the search result organization style based on the retrieved content items. For example, when the retrieved content items mainly belong to one type, the item retrieval unit 502 may determine to organize them as a list; and when the retrieved content items belong to diversified types, the item retrieval unit 502 may determine to organize them in multiple frames.

The text representation unit 504 in this example receives the retrieved content items from the item retrieval unit 502 and generates a text representation for each retrieved content item. The text representation unit 504 may be optional in some embodiments. The text representation unit 504 may help to re-format a content item as short text to be presented in a frame. For example, it would be inconvenient or impossible to present an entire news article in a frame. For a retrieved stream news article, the text representation unit 504 may use its news headline as a text representation. For a retrieved query suggestion, the text representation unit 504 may use it directly as a text representation without modification. For a stream advertisement, the item retrieval unit 502 may use its title as a text representation. If the advertisement's title is too long, the item retrieval unit 502 may leverage text summarization and/or NLP (natural language processing) techniques to generate a short title for representation.

The response prediction unit 506 in this example receives the retrieved content items each represented by a short text. For each retrieved content item, the response prediction unit 506 may calculate a response probability or predict a response rate based on a machine learning model. Parameters for the model may be learned with historical user responses that may be stored in the search engine 302. A response rate for an item may represent how likely the user will give a response on the item, given the query and the frame slot where the item is located. The response may be a click, a zooming action, or other activities from the user related to the item.

In one embodiment, the response prediction unit 506 may also determine information about a framed structure, e.g. layout of the framed structure, based on the historical user responses. The response prediction unit 506 may send information about the response prediction and/or the framed structure to the item organization unit 508 for content item assignment.

The item organization unit 508 in this example can determine an objective for content item organization. The objective may be to maximize CTR, maximize expected revenue gain, or maximize another measurement about user engagement. Based on the objective, the response prediction information and/or the framed structure information, the item organization unit 508 may select the content items and assign each of them to a corresponding frame. As such, the item organization unit 508 can generate an organized search result in a framed structure and send the search result to the search engine 302 or directly to the user. In one embodiment, the item organization unit 508 may generate and send an instruction to the search engine 302, such that the search engine 302 may generate the organized search result according to the instruction and send it to the user.

Figure 6:
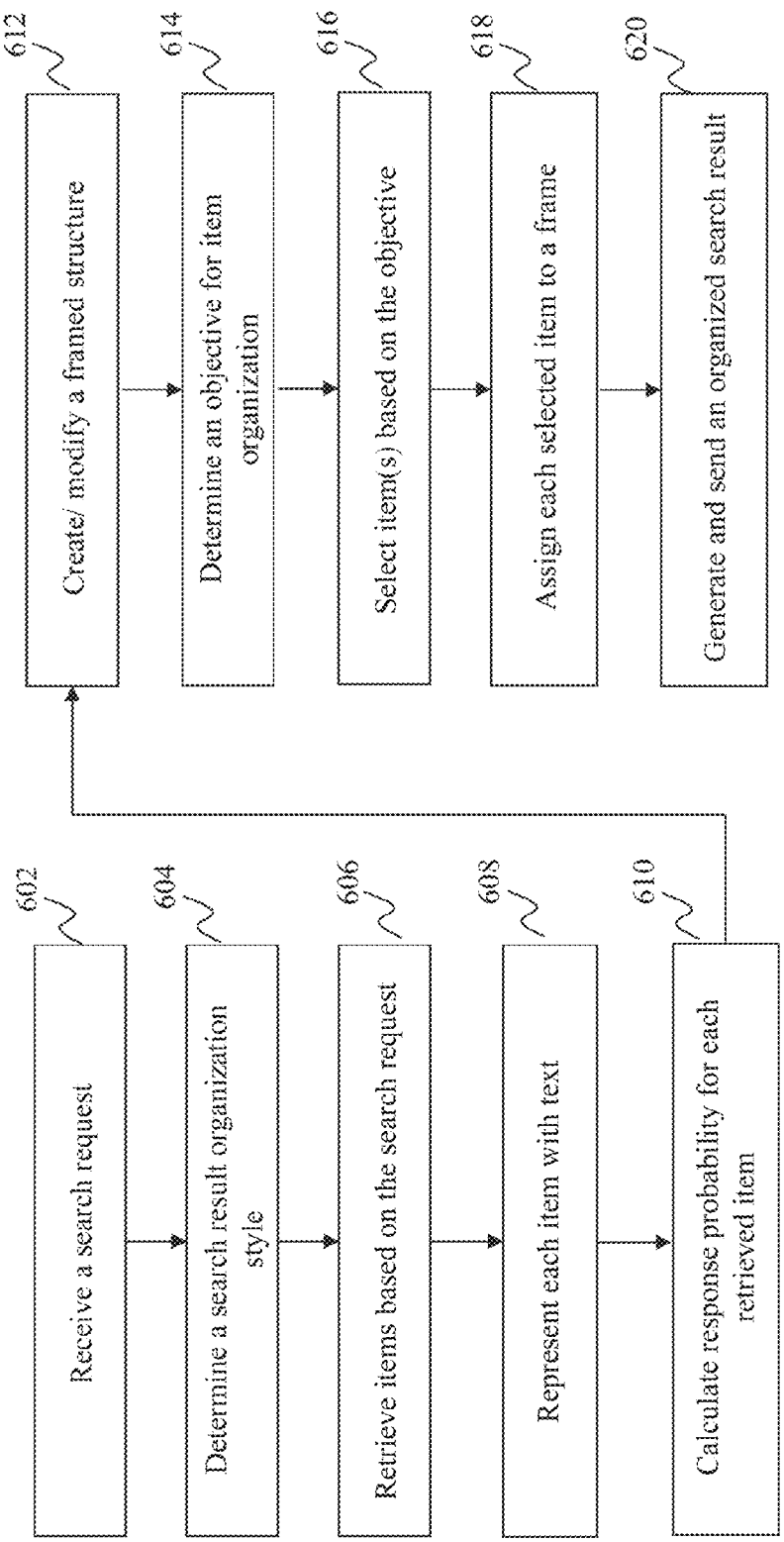
FIG. 6 is a flowchart of an exemplary process performed by a search result organizer, according to an embodiment of the present teaching.

FIG. 6 is a flowchart of an exemplary process performed by the search result organizer 304, according to an embodiment of the present teaching. At 602, a search request is received. At 604, a search result organization style is determined. At 606, one or more content items are retrieved based on the search request. At 608, each content item is optionally represented with text. At 610, a response probability is calculated for each retrieved item. At 612, a framed structure is created or modified. It can be understood that the steps of 610 and 612 may be performed in an order other than what is shown in FIG. 6. For example, 612 may be performed before 610, or 610 and 612 are performed in parallel.

At 614, an objective is determined for item organization. At 616, item(s) are selected based on the objective. At 618, each selected item is assigned to a frame, e.g. based on the calculated response probability and the objective. At 620, an organized search result is generated and sent, based on the item assignment. In one embodiment, at 620, an instruction may be generated and sent to the search engine 302 for generating the organized search result.

Figure 7:
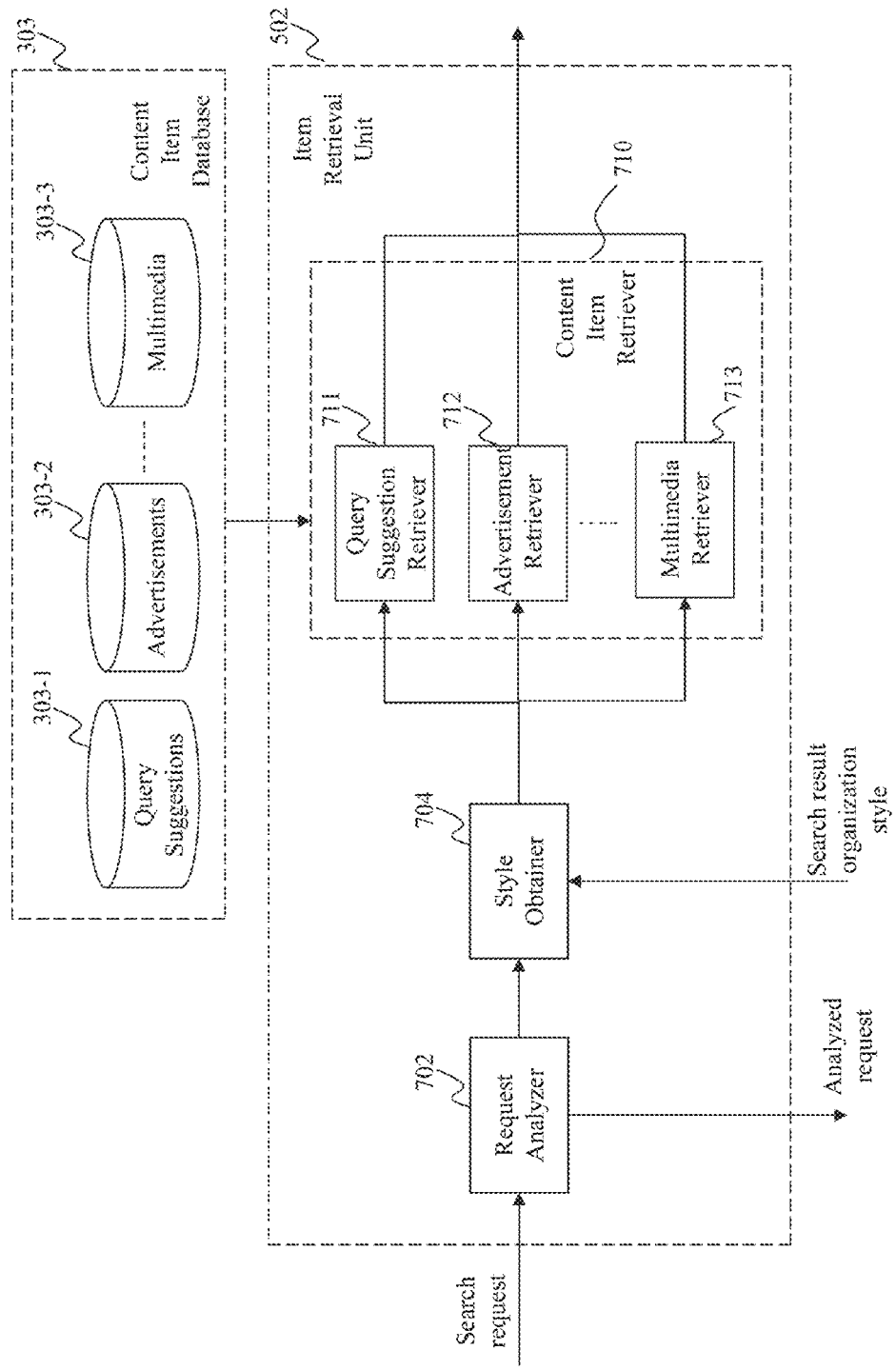
FIG. 7 illustrates an exemplary diagram of an item retrieval unit, according to an embodiment of the present teaching.

FIG. 7 illustrates an exemplary diagram of the item retrieval unit 502, according to an embodiment of the present teaching. The item retrieval unit 502 in this example includes a request analyzer 702, a style obtainer 704, and a content item retriever 710.

The request analyzer 702 in this example receives a search request, either from the search engine 302 or from a user 308. The request analyzer 702 may analyze the search request to obtain information about the user's identity, query, search history, etc. The request analyzer 702 may send the analyzed request to the item organization unit 508 for determining a search result organization style. For example, the item organization unit 508 may determine to present a search result in a list based on the query, or determine to present a search result in a framed structure based on the user's previous search history. The style obtainer 704 in this example receives the analyzed request from the request analyzer 702 and obtains the search result organization style from the item organization unit 508. The style obtainer 704 may send the organization style to the content item retriever 710 for retrieving one or more content items.

The content item retriever 710 in this example retrieves content items from the content item database 303, based on the search result organization style. In this example, the content item retriever 710 comprises a query suggestion retriever 711, an advertisement retriever 712, and a multimedia retriever 713. The query suggestion retriever 711 may retrieve query suggestions from the database 303-1, based on e.g. a pre-fix match with the query or content of a web page that the user is viewing. For example, a query suggestion "midterm election 2014" may be retrieved based on a query "midterm election." The query suggestion retriever 711 may also identify relevant queries by mining search session logs to find frequent co-occurring queries with the original query, and select the relevant queries as query suggestions.

The advertisement retriever 712 may retrieve advertisements from the database 303-2, based on e.g. the query and/or demographic information of the user. For example, an advertisement about a treadmill may be retrieved based on a query "running machine". In practice, the advertisement retriever 712 may extract keyword features from an advertisement, calculate a cosine-similarity between the advertisement and the query, and retrieve the advertisement if the cosine-similarity is higher than a predetermined threshold. The multimedia retriever 713 may retrieve a multimedia, e.g. a video clip, an image, a piece of music, etc., from the database 303-3. For example, a video clip as a trailer may be retrieved from the database 303-3, based on a query "star wars."

In one embodiment, the content item retriever 710 may also retrieve tags related to the query, referred as #hashtag#. For example, the content item retriever 710 may extract keywords from within a #hashtag# and surrounding contexts, calculate a cosine-similarity between query and the #hashtag# using the extracted keywords, and retrieve the #hashtag# if the cosine-similarity is higher than a predetermined threshold.

In another embodiment, the content item retriever 710 may also retrieve some knowledge graph concept related to the query. For example, each concept in a Knowledge Graph can be represented as a vector of keywords. The content item retriever 710 may calculate a cosine-similarity between a concept and the query, and retrieve the concept if the cosine-similarity is higher than a predetermined threshold.

Each retriever in the content item retriever 710 may retrieve content items based on the search result organization style. For example, a retriever may retrieve more content items if the search result is to be presented in a framed structure; and may retrieve less content items if the search result is to be presented in a list. In addition, the content item retriever 710 may retrieve more diversified content items if the search result is to be presented in a framed structure. After retrieving the content items, the content item retriever 710 may send the retrieved content items to the text representation unit 504 for generating a text representation for each content item.

As discussed above, a content item may need to be re-formatted as short text to be displayed in the framed structure, e.g. an entire stream news article cannot fit in a frame due to a limited size of the frame. Typically, NLP and syntax-based text summarization techniques may be leveraged to extract a short text from the retrieved content item. For example, the text representation unit 504 may not need to modify a query suggestion or a #hashtag#. The text representation unit 504 may extract an entity name from a knowledge graph concept to represent the concept. For an advertisement, if the title is still too long, the text representation unit 504 may leverage text summarization and NLP technologies to further shorten the title. For example, "Elon Musk's Space X Claims an 'Evolutionary' Breakthrough in Rocket Technology" may be shortened to be "Rocket Tech Breakthrough."

Figure 8:
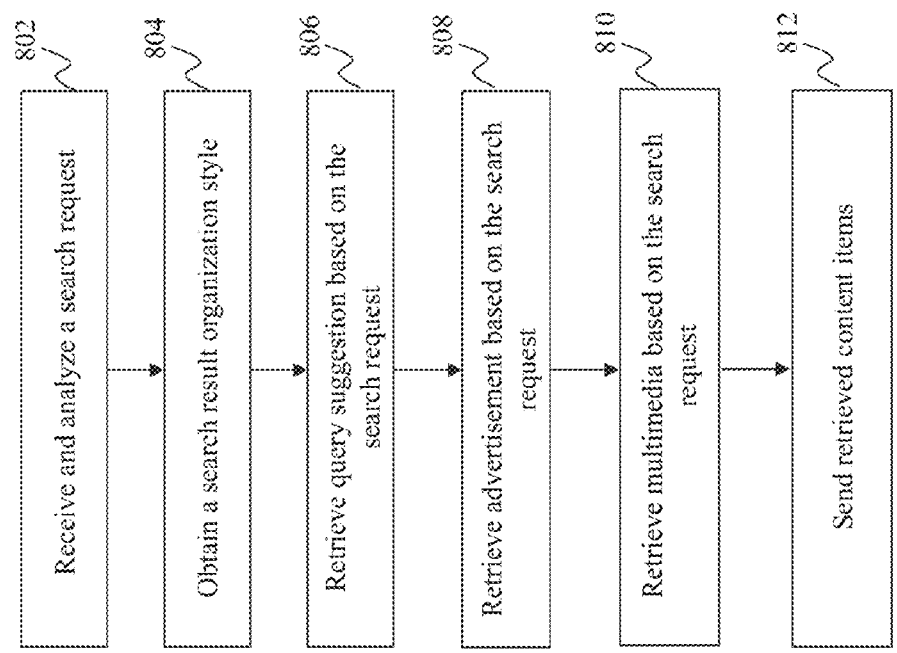
FIG. 8 is a flowchart of an exemplary process performed by an item retrieval unit, according to an embodiment of the present teaching.

FIG. 8 is a flowchart of an exemplary process performed by the item retrieval unit 502, according to an embodiment of the present teaching. At 802, a search request is received and analyzed. At 804, a search result organization style is obtained. At 806, a query suggestion is retrieved based on the search request. At 808, an advertisement is retrieved based on the search request. At 810, multimedia content is retrieved based on the search request. At 812, the retrieved content items are sent, e.g. to be represented with text.

Figure 9:
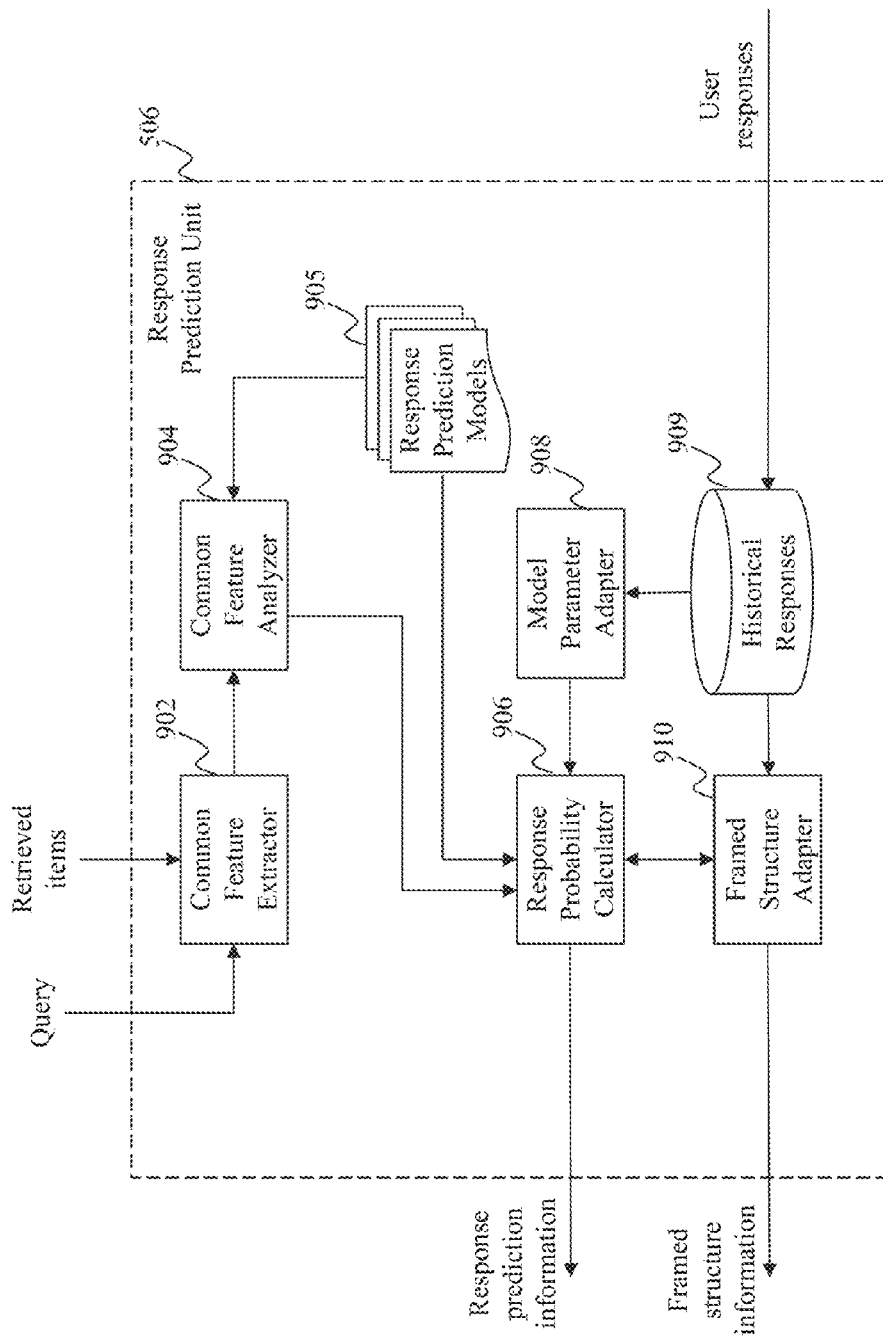
FIG. 9 illustrates an exemplary diagram of a response prediction unit, according to an embodiment of the present teaching.

FIG. 9 illustrates an exemplary diagram of the response prediction unit 506, according to an embodiment of the present teaching. The response prediction unit 506 in this example includes a common feature extractor 902, a common feature analyzer 904, one or more response prediction models 905, a response probability calculator 906, a model parameter adapter 908, a historical response database 909, and a framed structure adapter 910.

The common feature extractor 902 in this example receives the query submitted by the user and the retrieved content items related to the query. The common feature extractor 902 may extract one or more common features between the query and the retrieved content items. The common feature analyzer 904 may analyze the common features based on a response prediction model 905.

The response prediction model may be a machine learning model based on which the response rate can be predicted for a content item. In one embodiment, for a given query and a content item, the response probability for the content item is modeled in the following way:

$$P(response|query, element, slot_i) = P(response|query, element) * P(notice|slot_i)$$

where element stands for the short text representation of the content item; $slot_i$ is the i-th slot in the framed structure; $P(notice|slot_i)$ is the probability that this slot is noticed by the user; and P(response|query, element) is a position-irrelevant term indicating how likely a user clicks on the element given the query.

Then, alternative models can be used to parameterize P(response|query, element) and $P(notice|slot_i)$. For example, $$P(response | query, element) = \sum_{k=1}^{n} w_k * F_{query,k} * F_{element,k}$$

where $F_{query,k}(F_{element,k})$ is the value of the k-th common feature of the query (element); $w_k$ is the model parameter to be learned. And $P(notice|slot_i)=a_i$, where $a_i$ is the parameter to be learned. The system may learn the model parameters with historical log data in which user response feedbacks on each frame in the framed structure are available.

In one embodiment, the response probability calculator 906 can select a response prediction model, e.g. based on a predetermined framed structure. In this embodiment, the framed structure adapter 910 may determine a framed structure based on historical responses from users, without considering the retrieved content items. The historical responses from users are stored in the database 909 and can be retrieved by the framed structure adapter 910. The framed structure adapter 910 may identify a most popular framed structure with a specified size for each frame, based on historical user responses. In that situation, the response probability calculator 906 may select a response prediction model, based on the layout of the identified framed structure.

In this embodiment, the model parameter adapter 908 may create or modify parameters for the selected response prediction model, e.g. the parameter $w_k$ and/or the parameter $a_i$ in the above exemplary model, based on the historical user responses. The response probability calculator 906 may then calculate a response probability based on the model with modified parameters. In accordance with the above exemplary model, the response probability calculator 906 may calculate a response probability for each content item located at each slot in the framed structure. The response probability calculator 906 may send the response probability information to the item organization unit 508 for search result organization. The framed structure adapter 910 in this embodiment may also send the framed structure information to the item organization unit 508 for search result organization.

In another embodiment, the response probability calculator 906 can select a response prediction model, without consideration of the framed structure to be used. In this embodiment, the response probability calculator 906 can select a response prediction model based on the common feature analyzed by the common feature analyzer 904, the historical responses from the database 909, but not based on a layout of the framed structure. Instead, the framed structure adapter 910 may determine the framed structure based on the response probability with respect to each retrieved content item.

In this embodiment, the model parameter adapter 908 may create or modify parameters for the selected response prediction model, e.g. the parameter $w_k$ and/or the parameter $a_i$ in the above exemplary model, based on the historical user responses. The response probability calculator 906 may then calculate a response probability based on the model with modified parameters. In accordance with the above exemplary model, the response probability calculator 906 may calculate a response probability for each content item located at each slot in the framed structure. Since the framed structure has not been determined at the calculation of the response probability, the response probability calculator 906 may calculate the response probability with respect to a predetermined set of slot positions and sizes. For example, for a retrieved map, the response probability calculator 906 may calculate a plurality of response probabilities with respect to four slot positions {center, middle upper, left upper, left lower} (of the entire framed structure) and five slot sizes {90%, 80%, 70%, 60%, 50%} (relative to area of the entire framed structure). The response probability calculator 906 and the framed structure adapter 910 may cooperate to determine one of the plurality of response probabilities for the retrieved map, with the corresponding slot position and size, e.g. based on historical user responses. After determining a response probability for each content item, the layout of the framed structure is also determined accordingly. The response probability calculator 906 may send the response probability information to the item organization unit 508 for search result organization. The framed structure adapter 910 in this embodiment may also send the framed structure information to the item organization unit 508 for search result organization. In one example, the response probability calculator 906 and the framed structure adapter 910 may send information about the plurality of response probabilities with multiple slot positions and sizes for the item organization unit 508 to determine an optimal search result organization.

Figure 10A:
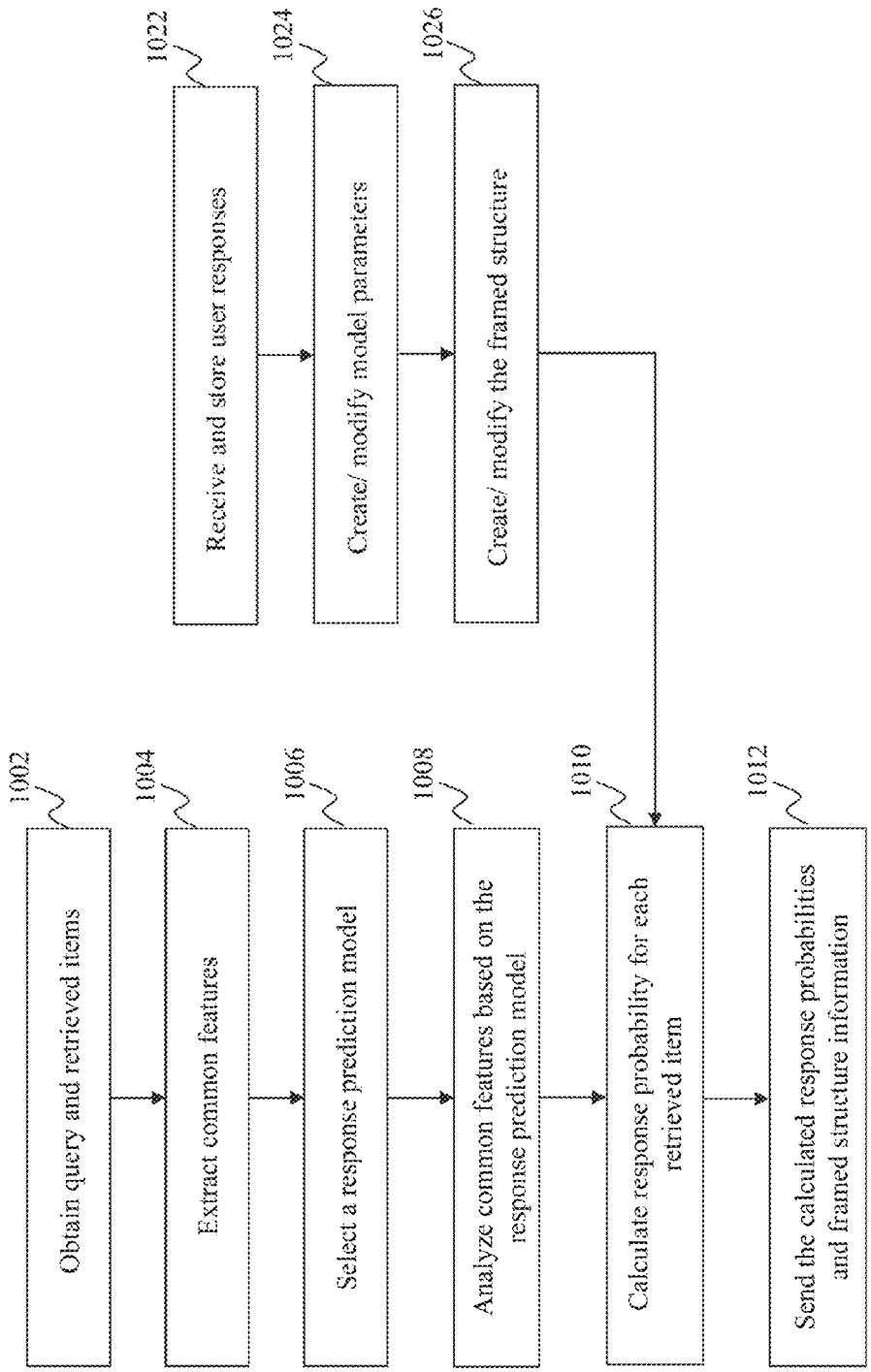
FIG. 10A is a flowchart of an exemplary process performed by a response prediction unit, according to an embodiment of the present teaching.

FIG. 10A is a flowchart of an exemplary process performed by the response prediction unit 506, according to an embodiment of the present teaching. At 1002, the query and retrieved content items are obtained. At 1004, one or more common features are extracted between the query and each retrieved content item. At 1006, a response prediction model is selected. At 1008, the common features are analyzed based on the response prediction model, and the process goes to 1010.

In parallel to the steps of 1002-1008, the system may perform 1022-1026 as shown in FIG. 10A. At 1022, user responses are received and stored, e.g., in a database. At 1024, model parameters are created or modified for the response prediction model. In one example, the model parameters may be modified for each response prediction model, regardless of which model is to be selected. At 1026, the framed structure is created or modified based on the stored user responses, and the process goes to 1010. In this embodiment, the framed structure is determined without considering the response probability for each content item.

At 1010, a response probability is calculated for each retrieved content item. At 1012, the calculated response probabilities and framed structure information are sent for search result organization.

Figure 10B:
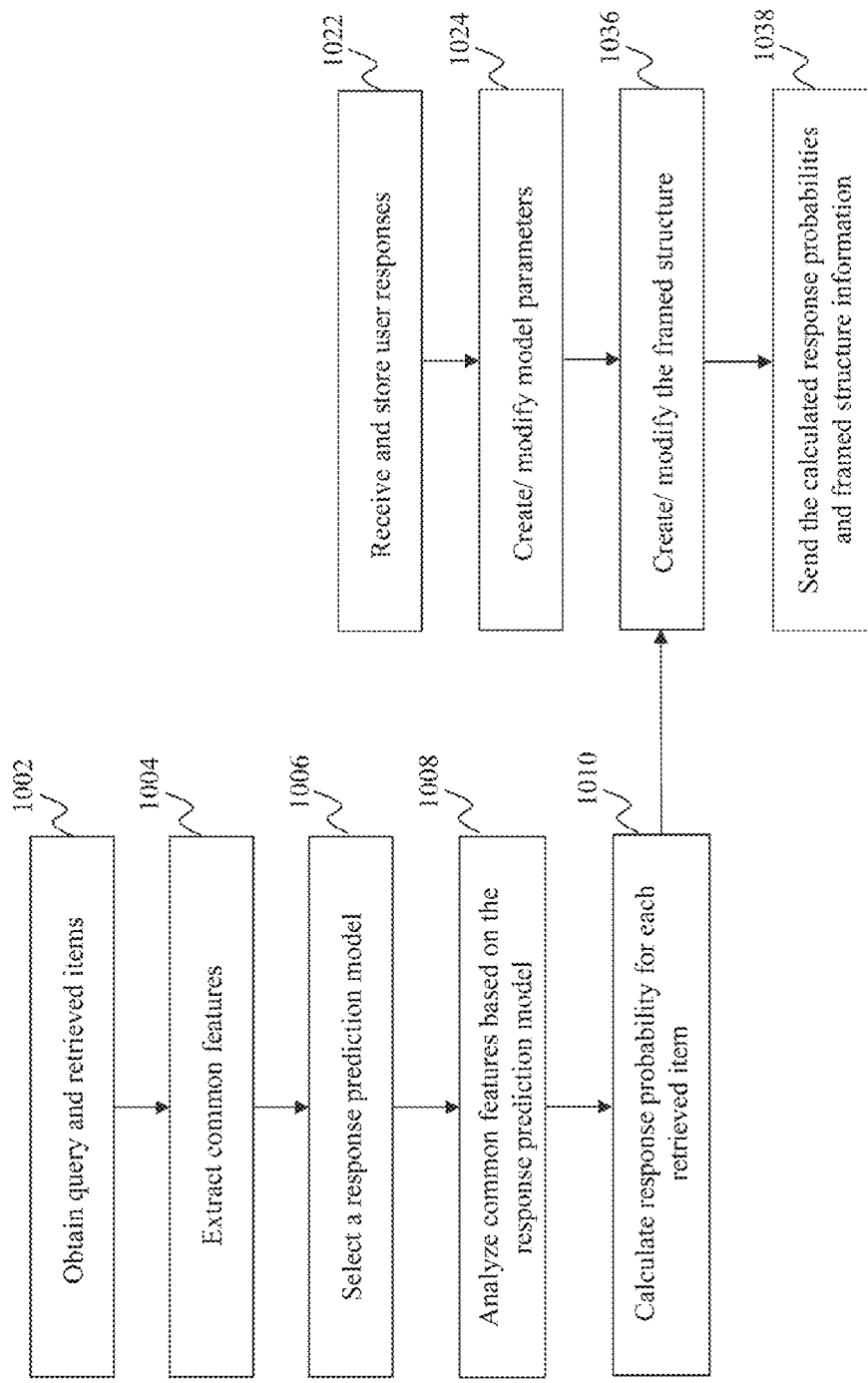
FIG. 10B is a flowchart of another exemplary process performed by a response prediction unit, according to an embodiment of the present teaching.

FIG. 10B is a flowchart of another exemplary process performed by the response prediction unit 506, according to an embodiment of the present teaching. At 1002, the query and retrieved content items are obtained. At 1004, one or more common features are extracted between the query and each retrieved content item. At 1006, a response prediction model is selected. At 1008, the common features are analyzed based on the response prediction model. At 1010, a response probability is calculated for each retrieved content item, and the process moves to 1036.

In parallel to the steps of 1002-1010, the system may perform 1022-1024 as shown in FIG. 10B. At 1022, user responses are received and stored, e.g., in a database. At 1024, model parameters are created or modified for the response prediction model. In one example, the model parameters may be modified for each response prediction model, regardless of which model is to be selected. The process then moves to 1036.

At 1036, the framed structure is created or modified based on the response probability for each content item. For example, a plurality of frame positions and sizes can be checked for a content item, where a response probability can be calculated for each frame position and each size. At 1038, the calculated response probabilities and framed structure information are sent for search result organization.

Figure 11:
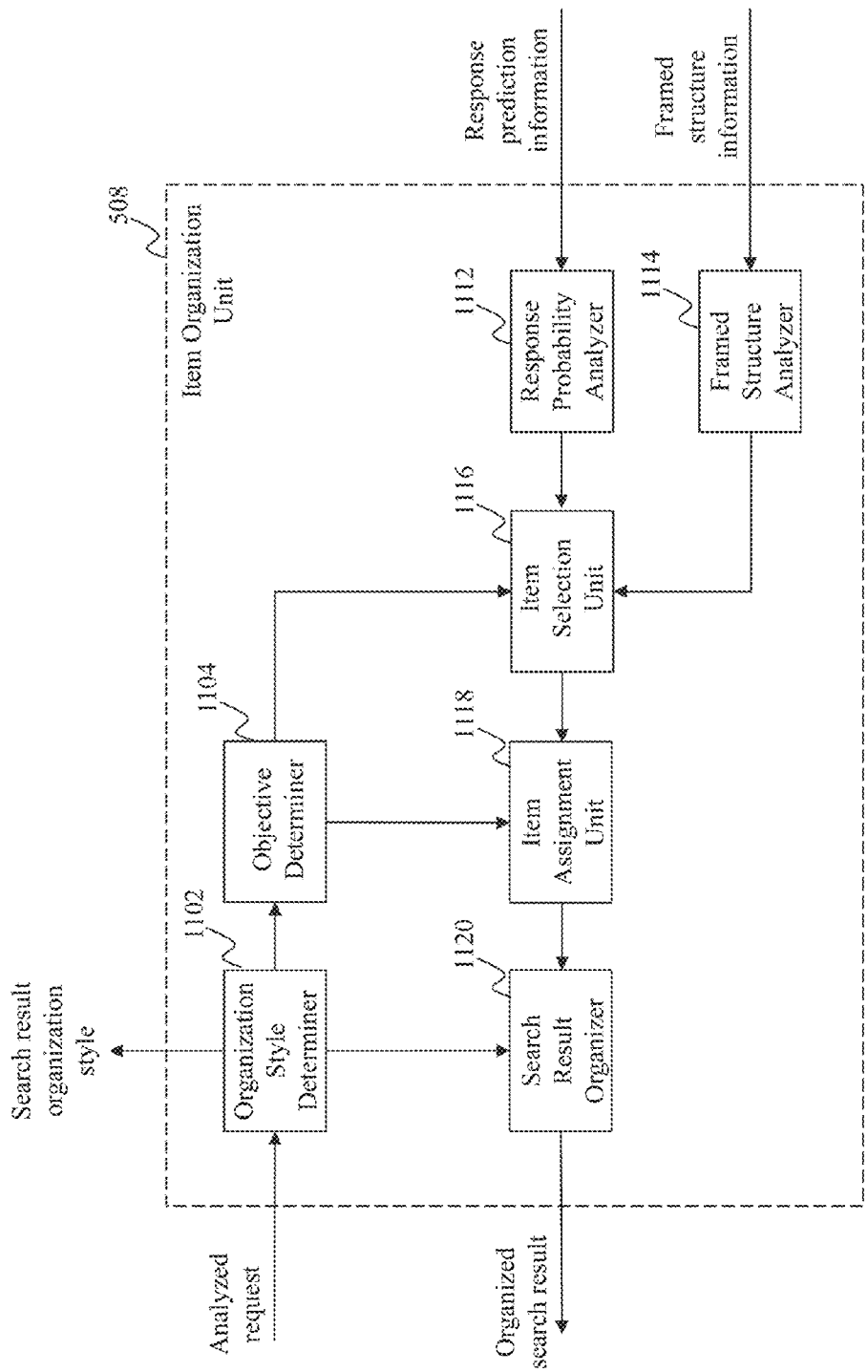
FIG. 11 illustrates an exemplary diagram of an item organization unit, according to an embodiment of the present teaching.

FIG. 11 illustrates an exemplary diagram of the item organization unit 508, according to an embodiment of the present teaching. The item organization unit 508 in this example includes an organization style determiner 1102, an objective determiner 1104, a response probability analyzer 1112, a framed structure analyzer 1114, an item selection unit 1116, an item assignment unit 1118, and a search result organizer 1120.

The organization style determiner 1102 in this example receives the analyzed request from the item retrieval unit 502 and determines a search result organization style for the search result. For example, the organization style determiner 1102 may determine to organize content items in the search result in multiple frames, because the query may be related to various types of content items and/or the user had a high engagement level regarding a framed structure. The organization style determiner 1102 may send the search result organization style to the item retrieval unit 502 for retrieving content items.

The objective determiner 1104 in this example determines an objective function for search result organization, e.g. based on the search result organization style. The objective determiner 1104 may send the determined objective function to the item selection unit 1116 and the item assignment unit 1118. In one example, the objective function is overall CTR, and the search result will be organized to maximize the overall CTR. In the exemplary model shown above, the response in P(response|query, element) may be represented by "click" for maximizing the overall CTR.

In another example, the objective function is expected revenue gain. Each click on the element in a frame can generate different revenue impacts. For example, clicks on (formatted) stream ads can bring direct revenue while clicks on relevant searches can bring indirect revenue by looking at the RPS (Revenue Per Search) of the relevant queries. Accordingly, the search result will be organized to maximize the expected revenue gain.

The response probability analyzer 1112 in this example receives response prediction information from the response probability calculator 906. The response prediction information may include response probabilities calculated by the response probability calculator 906. The framed structure analyzer 1114 in this example receives framed structure information from the framed structure adapter 910. The framed structure information may include layout information of the framed structure determined by the framed structure adapter 910. The response probability analyzer 1112 and the framed structure analyzer 1114 may analyze the information respectively and send the information to the item selection unit 1116.

The item selection unit 1116 in this example can optionally select one or more content items from the retrieved content items, based on the analyzed information about response prediction and framed structure. In one example, the item selection unit 1116 may determine that there are more retrieved content items than the frames available in the framed structure, such that some content items need to be selected to be put into the framed structure. In another example, the item selection unit 1116 may determine that a very high percentage of retrieved content items belong to a same type. In that case, the item selection unit 1116 may filter the retrieved content items of this type to keep a more diversified distribution of content items in the organized search result.

The item selection unit 1116 may select the content items based on the objective function determined by the objective determiner 1104. For example, the item selection unit 1116 may select more content items likely attracting user clicks, if the objective function is overall CTR. In one embodiment, the item selection unit 1116 may select all retrieved content items or filter out all retrieved content items. The item selection unit 1116 may send the selected content items to the item assignment unit 1118 for item assignment.

The item assignment unit 1118 in this example can assign each selected content item into a corresponding frame, based on the objective function determined by the objective determiner 1104. In one example, the objective function is overall CTR. The system can learn and calculate $P(notice|slot_i)$ and $P(response|query, element)$ for each element. Here the response is click. To maximize overall CTR on the tiled/framed area, the item assignment unit 1118 may assign the content item with the highest $P(response|query, element)$ to the highest $P(notice|slot_i)$. The item assignment unit 1118 may assign the content item with the second highest $P(response|query, element)$ to the second highest $P(notice|slot_i)$; assign the content item with the third highest $P(response|query, element)$ to the third highest $P(notice|slot_i)$; so on and so forth.

In another example, the objective function is expected revenue gain. For example, clicks on advertisements can bring direct revenue while clicks on query suggestions can bring indirect revenue by looking at the RPS of the query suggestions. Thus, given the expected revenue, either explicit or implicit, of each candidate element, the expected revenue gain is shown below if the element is displayed in the i-th slot in the tiled/framed area:

$$eRevGain(query, element, slot_i) = eRev(element) * P(response|query, element, slot_i)$$

To maximize revenue gain, the item assignment unit 1118 may assign the content item with the highest $eRev(element) * P(response|query, element)$ to the highest $P(notice|slot_i)$. The item assignment unit 1118 may assign the content item with the second highest $eRev(element) * P(response|query, element)$ to the second highest $P(notice|slot_i)$; assign the content item with the third highest $eRev(element) * P(response|query, element)$ to the third highest $P(notice|slot_i)$; so on and so forth.

It can be understood that the item assignment unit 1118 may assign content items according to an objective function other than the overall CTR and expected revenue gain. In one situation, if the search result organization style indicates a listed presentation, the item assignment unit 1118 may rank the content items in a list based on their respective response probabilities or expected revenue gain. In another situation, the search result organization style indicates a mixed presentation, e.g. some items presented in a list and some items presented in frames, the item assignment unit 1118 may perform both ranking in a list and item assignment to frames as discussed above.

The search result organizer 1120 in this example receives information about the content item assignment from the item assignment unit 1118 and the search result organization style from the organization style determiner 1102. The search result organizer 1120 may generate an organized search result based on the received information and send it to the search engine 302 or the user 308. In one embodiment, the search result organizer 1120 may generate and send an instruction to the search engine 302 for generating an organized search result according to the instruction.

Figure 12:
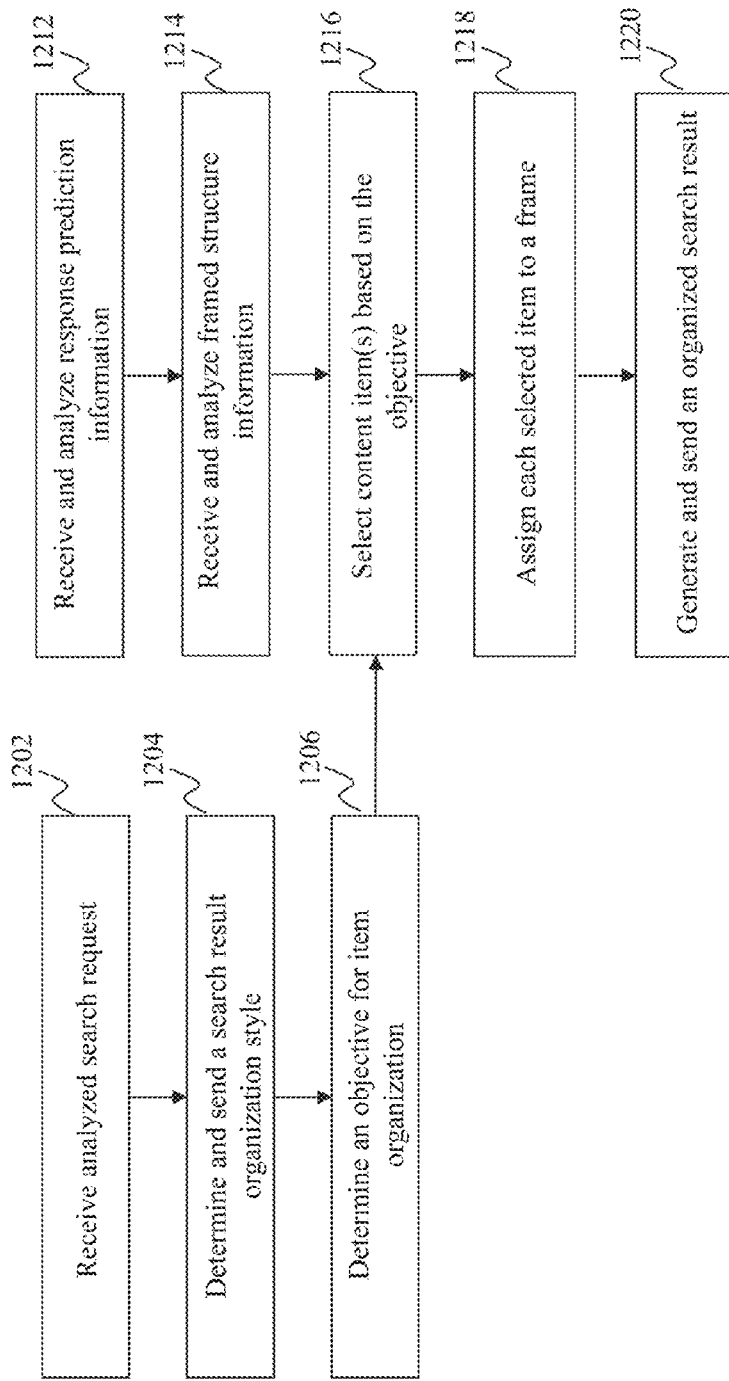
FIG. 12 is a flowchart of an exemplary process performed by an item organization unit, according to an embodiment of the present teaching.

FIG. 12 is a flowchart of an exemplary process performed by the item organization unit 508, according to an embodiment of the present teaching. At 1202, the analyzed search result is received. At 1204, a search result organization style is determined and sent. At 1206, an objective function is determined for item organization, and the process moves to 1216.

In parallel to the steps of 1202-1206, the system may perform 1212-1214 as shown in FIG. 12. At 1212, response prediction information is received and analyzed. At 1214, framed structure information is received and analyzed. The process then moves to 1216.

At 1216, one or more retrieved content items are selected based on the objective function. At 1218, each selected item is assigned into a frame. At 1220, an organized search result is generated and sent. In another embodiment, an instruction for generating the organized search result is generated and sent at 1220.

Figure 13:
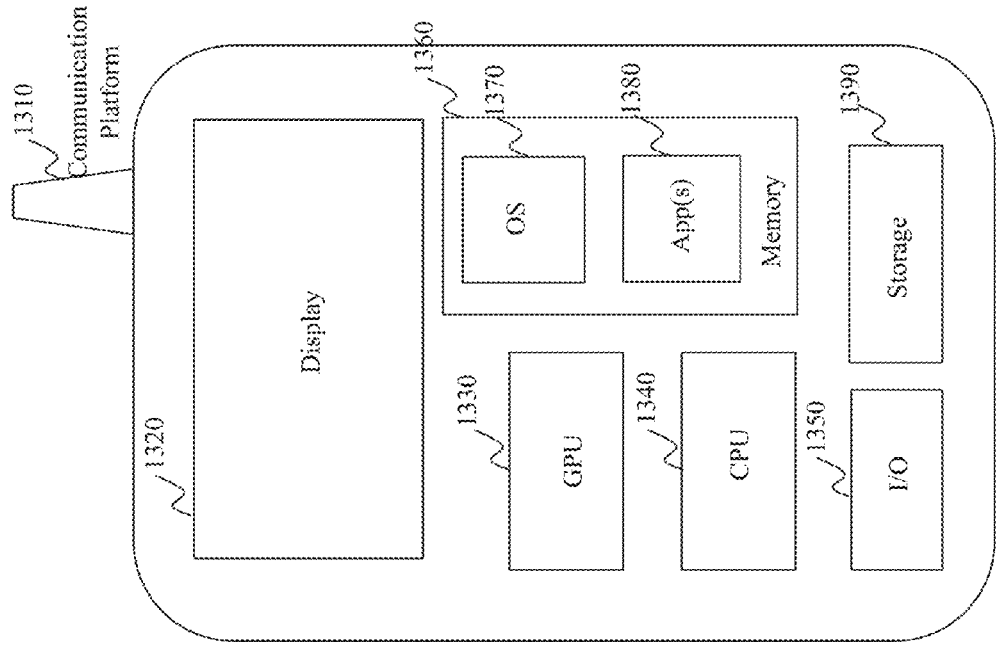
FIG. 13 depicts the architecture of a mobile device which can be used to implement a specialized system incorporating the present teaching.

FIG. 13 depicts the architecture of a mobile device which can be used to realize a specialized system implementing the present teaching. In this example, the user device on which content and advertisement are presented and interacted-with is a mobile device 1300, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1300 in this example includes one or more central processing units (CPUs) 1340, one or more graphic processing units (GPUs) 1330, a display 1320, a memory 1360, a communication platform 1310, such as a wireless communication module, storage 1390, and one or more input/output (I/O) devices 1350. Any other suitable component, including but not limited to a system bus or a controller (not shown), may also be included in the mobile device 1500. As shown in FIG. 13, a mobile operating system 1370, e.g., iOS, Android, Windows Phone, etc., and one or more applications 1380 may be loaded into the memory 1360 from the storage 1390 in order to be executed by the CPU 1340. The applications 1380 may include a browser or any other suitable mobile apps for search result generation and presentation on the mobile device 1300. User interactions with the content streams and advertisements in a search result may be achieved via the I/O devices 1350 and provided to the search engine 302 and/or the search result organizer 304 and/or other components of systems 300 and 400, e.g., via the network 310.

To implement various modules, units, and their functionalities described in the present disclosure, computer hardware platforms may be used as the hardware platform(s) for one or more of the elements described herein (e.g., the search engine 302 and/or the search result organizer 304 and/or other components of systems 300 and 400 described with respect to FIGS. 1-12). The hardware elements, operating systems and programming languages of such computers are conventional in nature, and it is presumed that those skilled in the art are adequately familiar therewith to adapt those technologies to generate and organize a search result as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 14:
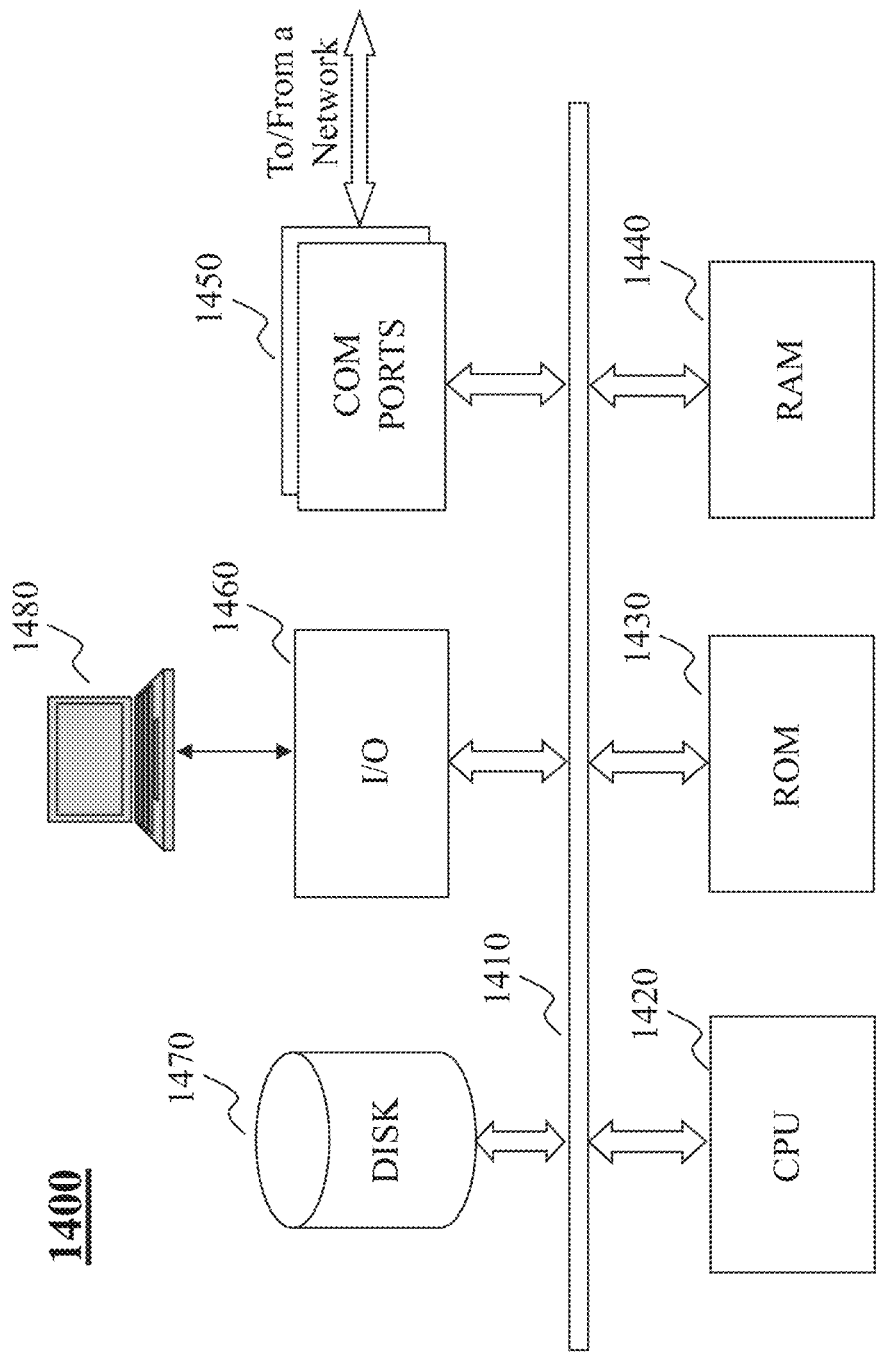
FIG. 14 depicts the architecture of a computer which can be used to implement a specialized system incorporating the present teaching.

FIG. 14 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1400 may be used to implement any component of the search result generation and organization techniques, as described herein. For example, the search result organizer 304, etc., may be implemented on a computer such as computer 1400, via its hardware, software program, firmware, or a combination thereof. Although only one such computer is shown, for convenience, the computer functions relating to search result generation and organization as described herein may be implemented in a distributed fashion on a number of similar platforms, to distribute the processing load.

The computer 1400, for example, includes COM ports 1450 connected to and from a network connected thereto to facilitate data communications. The computer 1400 also includes a central processing unit (CPU) 1420, in the form of one or more processors, for executing program instructions. The exemplary computer platform includes an internal communication bus 1410, program storage and data storage of different forms, e.g., disk 1470, read only memory (ROM) 1430, or random access memory (RAM) 1440, for various data files to be processed and/or communicated by the computer, as well as possibly program instructions to be executed by the CPU. The computer 1400 also includes an I/O component 1460, supporting input/output flows between the computer and other components therein such as user interface elements 1480. The computer 1400 may also receive programming and data via network communications.

Hence, aspects of the methods of search result generation and organization, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other search result organizer into the hardware platform(s) of a computing environment or other system implementing a computing environment or similar functionalities in connection with search result generation and organization. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the search result generation and organization as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on at least one computing device each of which has at least one processor, storage, and a communication platform connected to a network for providing a search result, the method comprising:
    receiving a search request from a user;
    determining a plurality of content items based on the search request;
    selecting one or more content items from the plurality of content items;
    generating a framed structure having at least one sub-component;
    determining a correspondence between the one or more content items and the at least one sub-component;
    arranging each of the one or more content items with respect to a corresponding sub-component;
    generating a search result based on the one or more content items and the framed structure; and
    providing the search result.

2. The method of claim 1, wherein the one or more content items are selected based on the framed structure.

3. The method of claim 1, wherein the one or more content items include at least one of: a query suggestion, an advertisement, a multimedia, an image, a video, a link, a map, a snippet, and news.

4. The method of claim 1, wherein the framed structure is generated based on the one or more content items.

5. The method of claim 1, wherein determining a correspondence further comprises:
    ranking the one or more content items to generate a first ranking list;
    ranking the at least one sub-component to generate a second ranking list; and
    determining the correspondence between the one or more content items and the at least one sub-component based on the first and second ranking lists.

6. The method of claim 5, wherein ranking the one or more content items comprises:
    extracting a common feature between the search request and each of the one or more content items;
    calculating a response probability for each of the one or more content items based on the common feature and a machine learning model, wherein the response probability represents a predicted response rate from the user with respect to the content item; and
    ranking the one or more content items based on their respective response probabilities.

7. The method of claim 1, wherein the determining is based on an objective to maximize at least one of: an overall click through rate on the framed structure, an expected revenue gain from the one or more content items, and a degree of user engagement on the framed structure.

8. A method, implemented on at least one computing device each of which has at least one processor, storage, and a communication platform connected to a network for providing a search result, the method comprising:
    obtaining a first search result including a plurality of content items;
    selecting one or more content items from the plurality of content items;
    generating a framed structure having at least one sub-component;
    determining a correspondence between the one or more content items and the at least one sub-component;
    modifying the first search result by moving each of the one or more content items into a corresponding sub-component;

generating a second search result based on the one or more content items and the framed structure; and providing the second search result.

9. The method of claim 8, further comprising providing the modified first search result.

10. A system having at least one processor, storage, and a communication platform connected to a network for providing a search result, the system comprising:
- a request analyzer configured for receiving a search request from a user;
- an item retrieval unit configured for determining a plurality of content items based on the search request and selecting one or more content items from the plurality of content items;
- a framed structure adapter configured for generating a framed structure having at least one sub-component;
- an item selection unit configured for determining a correspondence between the one or more content items and the at least one sub-component;
- an item assignment unit configured for arranging each of the one or more content items with respect to a corresponding sub-component;
- a search result organizer configured for generating a search result based on the one or more content items and the framed structure and providing the search result.

11. The system of claim 10, wherein the one or more content items are selected based on the framed structure.

12. The system of claim 10, wherein the one or more content items include at least one of: a query suggestion, an advertisement, a multimedia, an image, a video, a link, a map, a snippet, and news.

13. The system of claim 10, wherein the framed structure is generated based on the one or more content items.

14. The system of claim 10, further comprising:
- a response probability analyzer configured for ranking the one or more content items to generate a first ranking list; and
- a framed structure analyzer configured for ranking the at least one sub-component to generate a second ranking list, wherein the correspondence between the one or more content items and the at least one sub-component is determined based on the first and second ranking lists.

15. The system of claim 14, further comprising:
- a common feature extractor configured for extracting a common feature between the search request and each of the one or more content items;
- a response probability calculator configured for calculating a response probability for each of the one or more content items based on the common feature and a machine learning model, wherein
  - the response probability represents a predicted response rate from the user with respect to the content item, and
  - the one or more content items are ranked based on their respective response probabilities.

16. The system of claim 10, wherein the correspondence is determined based on an objective to maximize at least one of: an overall click through rate on the framed structure, an expected revenue gain from the one or more content items, and a degree of user engagement on the framed structure.

17. A system having at least one processor, storage, and a communication platform connected to a network for providing a search result, the system comprising:
- a request analyzer configured for obtaining a first search result including a plurality of content items;
- an item retrieval unit configured for selecting one or more content items from the plurality of content items;
- a framed structure adapter configured for generating a framed structure having at least one sub-component;
- an item selection unit configured for determining a correspondence between the one or more content items and the at least one sub-component;
- an item assignment unit configured for modifying the first search result by moving each of the one or more content items into a corresponding sub-component; and
- a search result organizer configured for generating a second search result based on the one or more content items and the framed structure and providing the second search result.

18. The system of claim 17, wherein the search result organizer is further configured for providing the modified first search result.

19. A machine-readable tangible and non-transitory medium having information for providing a search result, wherein the information, when read by the machine, causes the machine to perform the following:
- receiving a search request from a user;
- determining a plurality of content items based on the search request;
- selecting one or more content items from the plurality of content items;
- generating a framed structure having at least one sub-component;
- determining a correspondence between the one or more content items and the at least one sub-component;
- arranging each of the one or more content items with respect to a corresponding sub-component;
- generating a search result based on the one or more content items and the framed structure; and
- providing the search result.

20. A machine-readable tangible and non-transitory medium having information for providing a search result, wherein the information, when read by the machine, causes the machine to perform the following:
- obtaining a first search result including a plurality of content items;
- selecting one or more content items from the plurality of content items;
- generating a framed structure having at least one sub-component;
- determining a correspondence between the one or more content items and the at least one sub-component;
- modifying the first search result by moving each of the one or more content items into a corresponding sub-component;
- generating a second search result based on the one or more content items and the framed structure; and
- providing the second search result.

* * * * *